US008869165B2

(12) United States Patent
Dasgupta et al.

(10) Patent No.: US 8,869,165 B2
(45) Date of Patent: Oct. 21, 2014

(54) INTEGRATING FLOW ORCHESTRATION AND SCHEDULING OF JOBS AND DATA ACTIVITIES FOR A BATCH OF WORKFLOWS OVER MULTIPLE DOMAINS SUBJECT TO CONSTRAINTS

(75) Inventors: Gargi B. Dasgupta, New Delhi (IN); Balaji Viswanathan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1577 days.

(21) Appl. No.: 12/051,883

(22) Filed: Mar. 20, 2008

(65) Prior Publication Data

US 2009/0241117 A1     Sep. 24, 2009

(51) Int. Cl.
G06F 9/46      (2006.01)
G06F 9/50      (2006.01)

(52) U.S. Cl.
CPC .................................. *G06F 9/5038* (2013.01)
USPC ....................................................... 718/106

(58) Field of Classification Search
CPC .................................................. G06F 9/5038
USPC ................................................. 718/101, 106
See application file for complete search history.

(56) References Cited

U.S. PATENT DOCUMENTS

| 6,546,364 B1 | 4/2003 | Smirnov et al. |
| 7,240,324 B2 | 7/2007 | Casati et al. |
| 2006/0112388 A1 | 5/2006 | Taniguchi et al. |
| 2006/0250981 A1 | 11/2006 | Li et al. |
| 2007/0174101 A1 | 7/2007 | Li et al. |
| 2007/0283351 A1* | 12/2007 | Degenaro et al. ............. 718/100 |

FOREIGN PATENT DOCUMENTS

WO    WO2006074757    7/2006

OTHER PUBLICATIONS

Venugopal, Srikumar. "Scheduling Distributed Data-Intensive Applications on Global Grids", Deparment of Computer Science and Software Engineering, The University of Melbourne, Australia, Jul. 2006.*
Liu et al. "Dynamic batch processing in workflows: Model and implementation." Future Generation Computer Systems 23.3 (2007): 338-347.*
Anirban Mandal. Toward a Tool for Scheduling Application Workflows onto Distributed Grid Systems.
Nurmi, et al. Evaluation of a Workflow Scheduler Using Integrated Performance Modeling and Batch Queue Wait Time Prediction.
Mandal, et al. Scheduling Strategies for Mapping Application Workflows onto the Grid. HPDC 2005.

(Continued)

*Primary Examiner* — Abdullah Al Kawsar
*Assistant Examiner* — Brian Chew
(74) *Attorney, Agent, or Firm* — Ryan, Mason & Lewis, LLP

(57) ABSTRACT

Techniques for executing a batch of one or more workflows on one or more domains are provided. The techniques include receiving a request for workflow execution, sending at least one of one or more individual jobs in each workflow and dependency information to a scheduler, computing, by the scheduler, one or more outputs, wherein the one or more outputs are based on one or more performance objectives, and integrating orchestration of one or more workflows and scheduling of at least one of one or more jobs and one or more data transfers, wherein the integrating is used to execute a batch of one or more workflows based on at least one of one or more outputs of the scheduler, static information and run-time information.

17 Claims, 10 Drawing Sheets

(56) References Cited

OTHER PUBLICATIONS

Wieczorek, et al Taxonomies of the Multi-criteria Grid-Workflow Scheduling Problem A CoreGRID taxonomy paper.

Meyer et al. An Opportunistic Algorithm for Scheduling Workflows on Grids.

Liu et al. A Chaotic Genetic Algorithm for Fuzzy Grid Job Scheduling.

Oinn, et al.. Taverna: a tool for the composition and enactment of bioinformatics workflows.

van der Aalst, et al. Yawl: Yet another flow language.

Buyya et al. Cost-based scheduling of scientific workflow applications on utility grids.

Fakhouri et al. Active Middleware Services in a Decision Support System for Managing Highly Available Distributed Resources.

Agarwal et al. Deco: Data replication and execution co-scheduling for utility grids. In Proceedings of ICSOC, 2006.

Andrews et al. Business process execution language for web services, 2003.

Anjomshoaa et al. Job Submission Description Language (JSDL) Specification, Version 1.0. Global Grid Forum, 2005.

Berman et al. New grid scheduling and rescheduling methods in the grads project. International Journal of Parallel Programming (IJPP), vol. 33(2-3), 2005.

Berriman et al. Montage: A grid enabled image mosaic service for the national virtual observatory. In Astronomical Data Analysis Software and Systems XIII, 2003.

Floyd et al. Random early detection gateways for congestion avoidance IEEE/ACM Trans. Netw., 1(4), 1993.

Glatard et al. Flexible and efficient workflow deployement of data-intensive applications on grids with MOTEUR, IJHPCA, 2007.

Gucer et al. End-to-End Scheduling with IBM Tivoli Workload Scheduler Version. IBM Press, 2004.

Khanna et al Task scheduling and file replication for data-intensive jobs with batch-shared i/o. In Proceedings of the 15th IEEE International Symposium on HPDC, 2006.

Ko et al. New worker-centric scheduling strategies for data-intensive grid applications. In Middleware, 2007.

Kola et al. Run-time adaptation of grid data placement jobs. Parallel and Distributed Computing Practices, 2004.

Kosar et al. Stork: Making data placement a first class citizen in the grid. In Proc. of the 24th ICDCS, 2004.

Mohamed et al. An evaluation of the close-to-files processor & data co-allocation policy in multiclusters. In Proc. of IEEE International Conference on Cluster Computing, 2004.

Ranganathan et al Decoupling computation and data scheduling in distributed data-intensive applications. In Proc of the 11 th IEEE International Symposium on HPDC, 2002.

Ranganathan et al Computation scheduling and data replication algorithms for data grids. Grid resource management: state of the art and future trends, pp. 359-373, 2004.

Thain et al. Condor and the grid. In Grid Computing: Making the Global Infrastructure a Reality. 2002.

Deelman et al., Pegasus: A Framework for Mapping Complex Scientific Workflows onto Distributed Systems, Scientific Programming 13 (2005) 219-237.

\* cited by examiner

INTEGRATING FLOW ORCHESTRATION AND SCHEDULING OF JOBS AND DATA ACTIVITIES FOR A BATCH OF WORKFLOWS OVER MULTIPLE DOMAINS SUBJECT TO CONSTRAINTS

FIELD OF THE INVENTION

The present invention generally relates to information technology, and, more particularly, to executing workflows.

BACKGROUND OF THE INVENTION

The execution of workflow applications is a reality today in enterprise and scientific domains. To realize the potential of increased revenue by collective management of information technology (IT) resources, execution of these workflows on grid resources have assumed importance. The existing core middleware technologies for grids (for example, meta-schedulers) include sophisticated resource matching logic but lack control flow orchestration capability. Existing workflow orchestrators, on the other hand, suitably control enterprise logic but are unaware of execution requirements of tasks. Marriage of the scheduling technology with workflow management is thereby advantageous in the design of middleware for geographically distributed grids spanning organizational domains.

Existing endeavors concentrate on intra-domain workflow execution and use ad hoc, non-layered, non-standard solutions that reversely affect cross-organizational collaboration. In addition, existing approaches lack support for efficient data handling, especially crucial for performance of data intensive workflows in distributed data scenarios.

Also, existing approaches in workflow scheduling includes treating workflow orchestration and scheduling as separate activities, as well as handling only one workflow at a time. Additionally, in existing approaches, a scheduler computes mappings for each workflow without knowing the set of workflows to be executed, and the sharing of resources is not optimized between the batches. Existing approaches also include non-trivial extension to accommodate multiple workflows, and a scheduler that cannot control execution of the batch of workflows. Further, existing approaches include orchestrators that cannot honor schedule ordering of jobs across workflows. Consequently, a scheduler and orchestrator should advantageously integrate to handle this, but, however, existing approaches do not integrate such activities.

Existing approaches, for example, can include workflow orchestration such as Taverna (a tool for the composition and enactment of bioinformatics workflows), WS-BPEL (business process execution language for web services), and Yawl (a flow language). All such approaches are languages for workflow modeling and orchestration that, however, do not consider how the workflows are mapped to lower level resources.

Additionally, existing approaches can include, for example, workflow scheduling such as scheduling data-intensive workflows onto storage-constrained distributed resources. Such approaches can also include, for example, Pegasus, which is a framework for mapping complex scientific workflows onto distributed systems. Pegasus, however, does not provide support for multiple workflows.

Other existing approaches can include, for example, cost-based scheduling of workflow applications on utility grids. However, the existing approaches do not approach the problem of orchestrating and scheduling batch workflows on a shared set of resources.

Another existing approach includes, for example, Mounties, which is designed for managing applications and resources using rule-based constraints in cluster environments. However, Mounties does not work in the domain of grid jobs and data flows. Also, existing approaches additionally include, for example, event-based scheduling methods and systems for workflow activities. Such approaches, however, do not include integration with resource management or scheduling on available resources.

Existing approaches may not include, for example, a system where multiple independent workflows are optimally scheduled, consideration job and data, run-time adaptations provided for multiple workflows, and/or a dynamic scheduling algorithm for more than one workflow. Furthermore, repeated scheduling using single-workflow algorithms provides sub-optimal results. Also, extending a single workflow algorithm to multiple workflows is non-trivial and disadvantageous because the orchestrator does not know about resource selection across workflows, and the scheduler does not know about flow control of independent workflows.

SUMMARY OF THE INVENTION

Principles of the present invention provide techniques for integrating flow orchestration and scheduling for a batch of workflows.

An exemplary method (which may be computer-implemented) for executing a batch of one or more workflows on one or more domains, according to one aspect of the invention, can include steps of receiving a request for workflow execution, sending at least one of one or more individual jobs in each workflow and dependency information to a scheduler, computing, by the scheduler, one or more outputs, wherein the one or more outputs are based on one or more performance objectives, and integrating orchestration of one or more workflows and scheduling of at least one of one or more jobs and one or more data transfers, wherein the integrating is used to execute a batch of one or more workflows based on at least one of one or more outputs of the scheduler, static information and run-time information.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
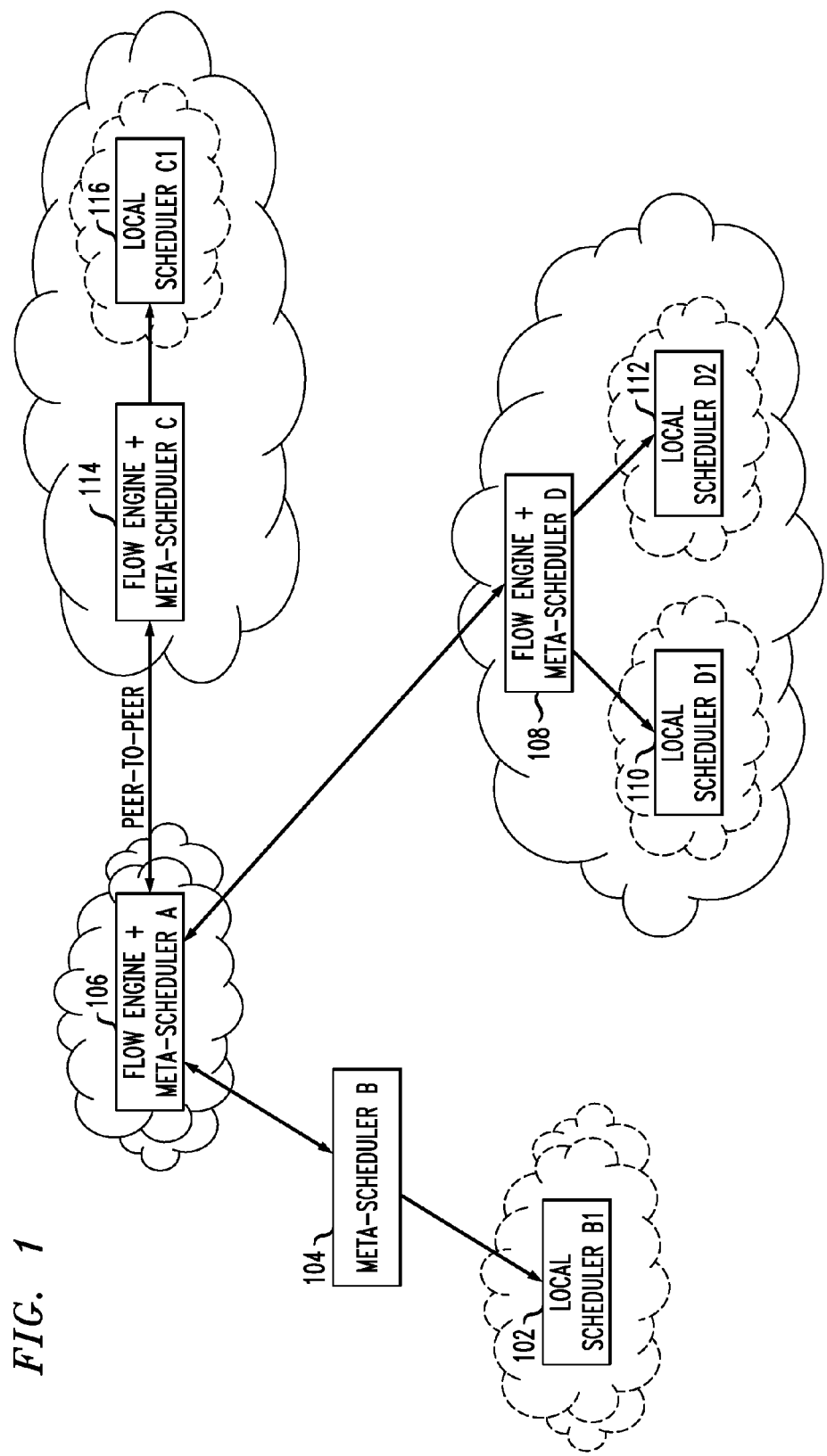
FIG. 1 is a diagram illustrating a distributed job-flow in grids, according to an embodiment of the present invention.

Principles of the present invention include integrating flow orchestration and scheduling for batch of workflows in grids. Additionally, principles of the invention also include dynamic workflow execution and job placement, across domains. One or more embodiments of the invention include an integrated component (that is, an integrated flow scheduler (IFS)) that does both workflow orchestration and scheduling in a distributed environment. An IFS can incorporate, for example, optimizations suggested by a scheduler into workflows. Also, IFS can advantageously impose these specific orderings and optimizations for a batch of workflows.

IFS can also handle run-time modifications and/or adaptations for changes in schedules, which become especially relevant for long-running environments. Additionally, IFS can, as noted above, incorporate optimizations suggested by scheduler and, at run-time, can adapt and/or modify such optimizations. In one or more embodiments of the invention, the IFS component can handle a batch of workflows, which may have cross workflow dependencies as imposed by scheduler. Also, the IFS component can be responsible for automated run-time modification in the flows.

As described herein, principles of the present invention integrate workflow orchestration with resource scheduling components, two distinct pieces especially relevant in a grid domain. In a domain of grids, the resource scheduling aspect of an application is as important as controlling its control and data dependencies. As noted above and further herein, one or more embodiments of the invention include an IFS component that ties together the workflow orchestration with the resource management, and also does run-time management. Also, one or more embodiments of the invention use the IFS, interact the two components and interface to execute a set of workflows. Additionally, the IFS can handle a batch of workflows, and any specified optimized orderings that need to be maintained between them, as well as any modifications that need to be applied at run-time.

As described above, existing approaches include, for example, workflow scheduling that includes policies and algorithms for scheduling a single workflow. Existing approaches directed toward multiple workflows, however, do not schedule both jobs and data in the workflows. Consequently, no existing approach includes scheduling a batch of workflows along with run-time adaptation of schedules.

In one or more embodiments of the invention, the IFS component is capable of performing multiple tasks. For example, the IFS component can send, to the scheduler, all jobs and all data for resource selection, as well as receive all mappings from the scheduler and incorporate these bindings, for both jobs and data, in the flow. The IFS component can also, for example, enforce execution of all workflows in accordance with scheduler mappings, maintain cross-workflow dependencies, and allow adaptation of domain schedules based on run-time information.

Inputs can include, for example, a batch of workflows (for example, a set of jobs, with control and data flow defined across jobs, and wherein a job flow can be modeled using enterprise process modeling), a set of resources on which jobs can be executed, and a set of data stores associated with the resources where data can be stored and transferred from and/or to. Also, a workflow orchestrator can contain, for example, a flow engine that can run multiple processes simultaneously, wherein each process can be controlled independently. Also, the workflow orchestrator may not, for example, have a knob for controlling the overall performance of a batch of workflows.

A job scheduler can, for example, include sophisticated matching logic for finding the suitable candidate resources for job execution, and a knob for controlling performance goals. Also, a job scheduler may not, for example, control job flow orchestration.

Execution of grid workflow batches is a significant requirement in enterprise and scientific grids. Most grid applications are composite and have a workflow structure. Grid resources are typically shared between multiple users, and integrating orchestrator and scheduler activities can advantageously lead to enhanced resource sharing, in turn leading to savings in time, power, revenue, etc.

In an illustrative embodiment, workflows (for example, W1, W2 ... W3) can be submitted by a user. The workflows can include, for example, a set of jobs (for example, J1, J2 ... Jn), a control flow defined between jobs, and a data flow defined between jobs. Dependency information can be passed to a scheduler. Dependency information can include, for example, job dependency (for example, J1-J2, J2-J3 ... ) and data dependency (for example, J1→D1, D2 ... Dn).

The scheduler can compute mappings, which can include, for example, finding matching resources for all job executions and finding appropriate resources for staging-in and/or out data. For each resource, a schedule can be computed for all workflows. For example, a schedule may appear as follows:

R1::W1:J1, W2:J1, W2:J2, ...
R2::W1:D1, W2:D2, ...

Schedule information can be enforced by an IFS component, which can bind jobs and/or data-transfers to matched resources, and enforce execution of workflows in accordance to a schedule. An orchestrator and a scheduler can, for example, coordinate to execute a batch of workflows on a set of resources.

As described herein, one or more embodiments of the present invention include an integrated flow scheduler (IFS), which allows interaction of activities between meta-scheduler and orchestrator. An IFS also allows local modifications to be made to workflow schedules based on run-time events to avoid and/or repair problems. As described below, one or more embodiments of the invention include an algorithm and techniques for incorporating run-time adaptations in a static schedule for batch workload in grid environments. Additionally, techniques are provided for both data and compute jobs.

As noted herein, principles of the present invention include techniques for executing data-intensive workflow applications in scientific and enterprise grids. Such applications process large and dynamic data sets, and often present a scope for optimized data handling that can be exploited for performance. In existing approaches, core grid middleware technologies of scheduling and orchestration have treated data management as a background activity, decoupled from job management and handled at the storage and/or network protocol level. However, as described herein, an advantageous component for building data-aware grid technologies lies in managing data flows at the application level, in conjunction with their computation counterparts. As such, one or more embodiments of the invention include Data-WISE, an end-to-end framework for management of data-intensive workflows as first-class citizens that addresses aspects of data flow orchestration, co-scheduling and run-time management.

Optimizations can be focused on exploiting application structure for use of data parallelism, replication, and run-time adaptations. In an illustrative embodiment of the invention, Data-WISE is implemented on a real test-bed and significant improvements are demonstrated in terms of application response time, resource utilization, and adaptability to varying resource conditions.

Data-intensive workflows include jobs that are executed as part of a functional unit with other jobs, and contain data dependencies among them. In addition, such datasets can be distributed across virtual organizations (VOs) and often accessed by a large number of computations. Poor integration of data movement, coupled with computing, makes data access cumbersome and difficult to scale. On the other hand, coordination of computation along with its data counterpart, referred to, for example, as co-scheduling, can lead to palatable data management and help realize the true enterprise potential of distributed environments such as grids. As such, one or more embodiments of the invention are aimed at performance-based data management, both at compile-time, where application structure can be exploited statically, and run-time, where variations may arise due to dynamism in workload patterns and/or resource states.

FIG. 1 is a diagram illustrating a distributed job-flow in grids, according to an embodiment of the present invention. By way of illustration, FIG. 1 depicts the elements of local scheduler B1 102, meta-scheduler B 104 of domain B, flow engine+meta-scheduler A 106 of domain A, flow engine+meta-scheduler D 108, local scheduler D1 110, local scheduler D2 112 of domain D, flow engine+meta-scheduler C 114 and local scheduler C1 116 of domain C. As illustrated in FIG. 1, multiple domains are connected by peer-to-peer technologies to form a grid. Also, job flows are submitted for execution at the domains, and sub-flows and/or sub-jobs can be dispatched across domain boundaries.

Figure 2:
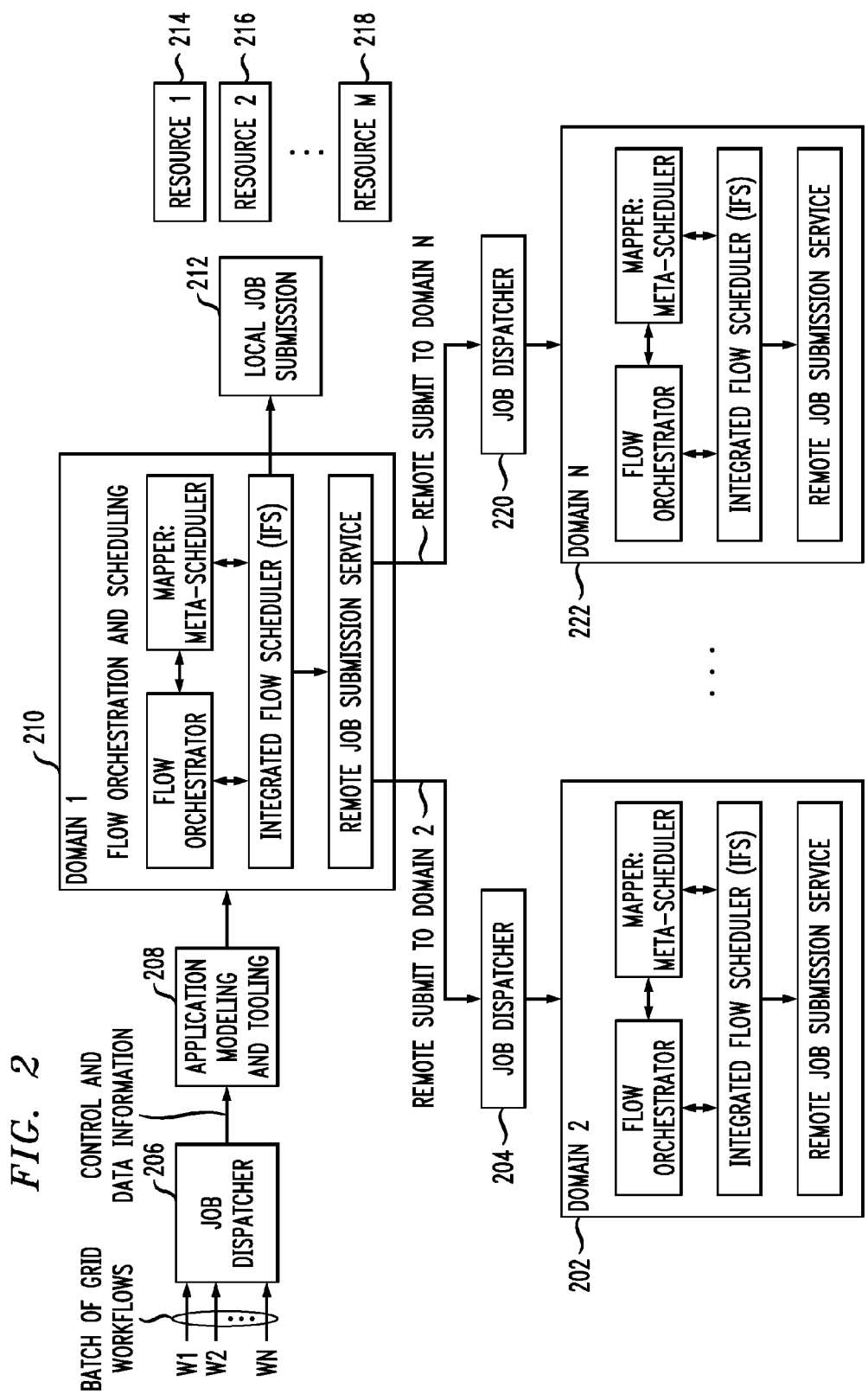
FIG. 2 is a diagram illustrating system architecture, according to an embodiment of the present invention.

FIG. 2 is a diagram illustrating system architecture, according to an embodiment of the present invention. By way of illustration, FIG. 2 depicts element 202, domain 2, which includes a mapper: meta-scheduler, a flow orchestrator, an integrated flow scheduler (IFS) and a remote job submission service residing in domain 2. Also, FIG. 2 depicts the elements of job dispatchers 204 and 206, and 220 of various domains. FIG. 2 additionally depicts element 210, domain 1, which includes a mapper: meta-scheduler, a flow orchestrator, an IFS and a remote job submission service, and additionally application modeling and tooling component 208 of domain 1. Other elements depicted in FIG. 2 include local job submission 212, resource 1 214, resource 2 216, resource M 218, and job dispatcher 220. Further, FIG. 2 depicts the element of domain N 222, which includes a mapper: meta-scheduler, a flow orchestrator, an IFS and a remote job submission service. FIG. 2 depicts various components of an exemplary embodiment of the invention across multiple domains, and captures high-level interaction among them.

Figure 3:
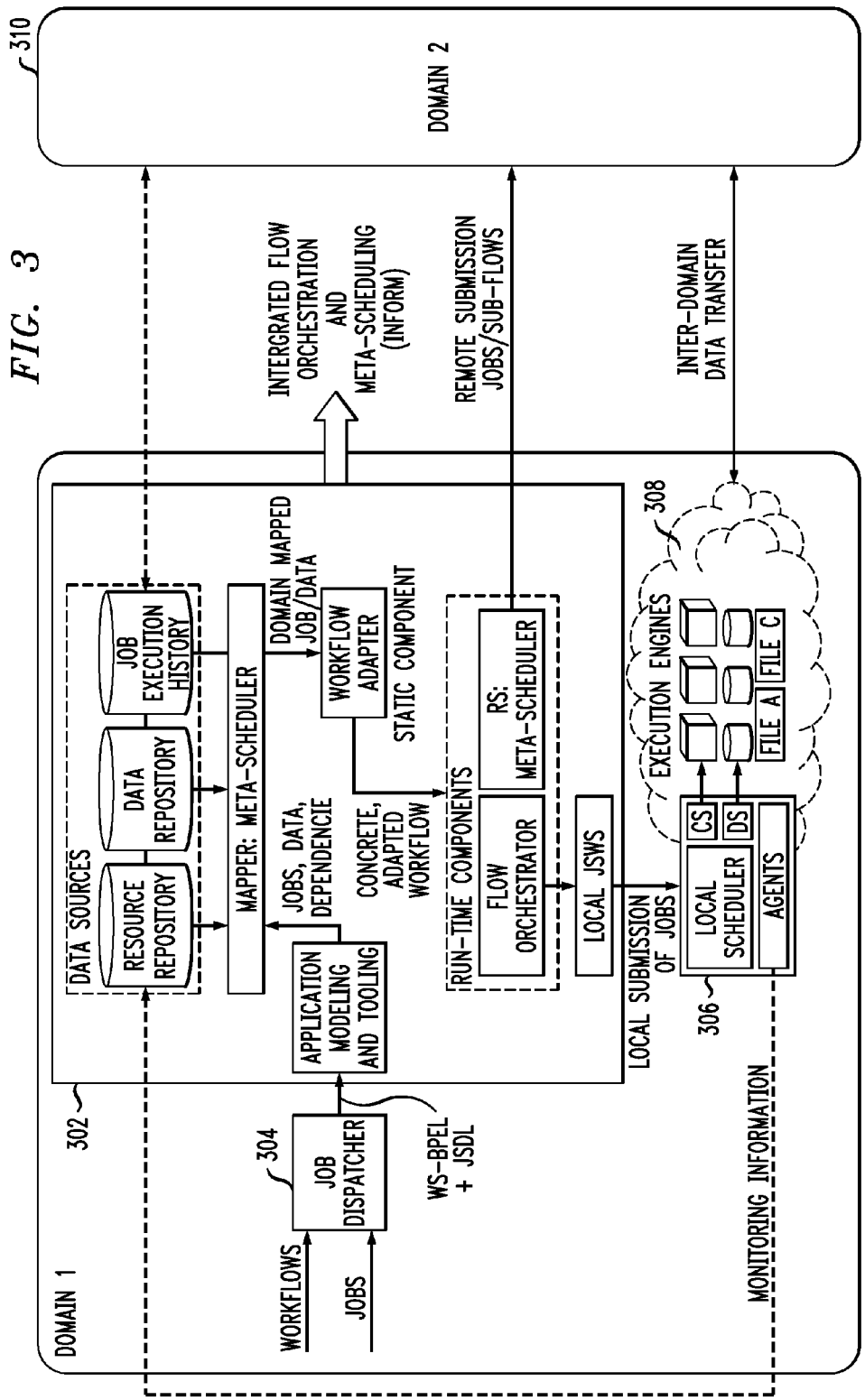
FIG. 3 is a diagram illustrating an implementation scenario, according to an embodiment of the present invention.

FIG. 3 is a diagram illustrating an implementation scenario, according to an embodiment of the present invention. By way of illustration, FIG. 3 depicts element 302, domain 1, which includes data sources (including, for example, a resource repository, a data repository, and job execution history), a mapper: meta-scheduler, an application modeling and tooling component, a workflow adapter, a flow orchestrator, a RS: meta-scheduler and a local job submission web service (JSWS). FIG. 3 also depicts job dispatcher 304, component 310 (that is, domain 2), execution engines 308 (including, for example, local data resources, file A and file C), and element 306 which includes a local scheduler, its agents, compute scheduler (CS) for handling compute jobs, and data scheduler (DS) for handling data jobs. FIG. 3 depicts the static and dynamic interaction of components of an exemplary embodiment (INFORM) of the invention with data sources and repositories to achieve integrated workflow scheduling.

Figure 4:
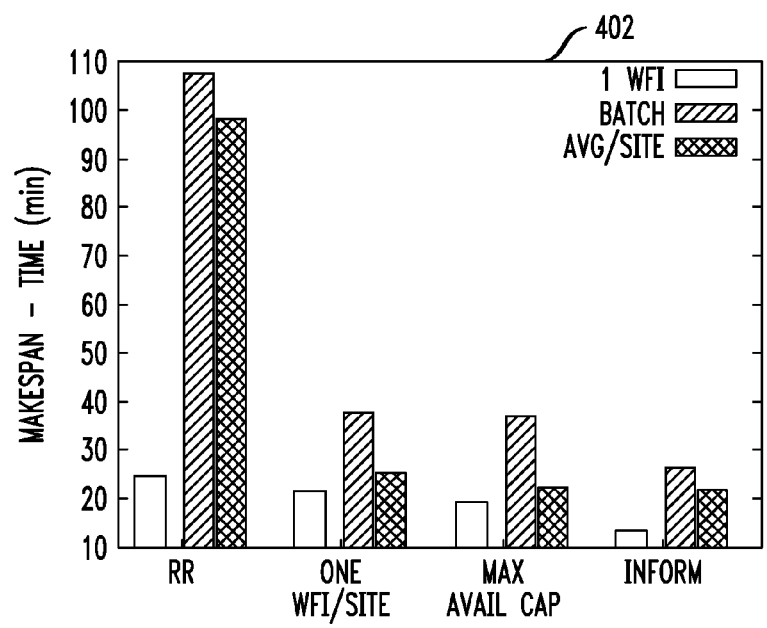
FIG. 4 is a diagram illustrating results of integrated workflow orchestration and scheduling, according to an embodiment of the present invention.

FIG. 4 is a diagram 402 illustrating results of integrated workflow orchestration and scheduling, according to an embodiment (INFORM) of the present invention. As depicted in FIG. 4, makespan results include a single workflow (that is, the time to execute all tasks in workflow) and a batch workflow (that is, the time to execute the whole batch). With respect to a single workflow in the system, comparable makespans exist among competing approaches. However, INFORM still has least makespan due to its co-scheduling of jobs and data transfers approach. For batch workflows, the difference in makespan is significant, wherein INFORM has the lowest batch wait times.

Figure 5:
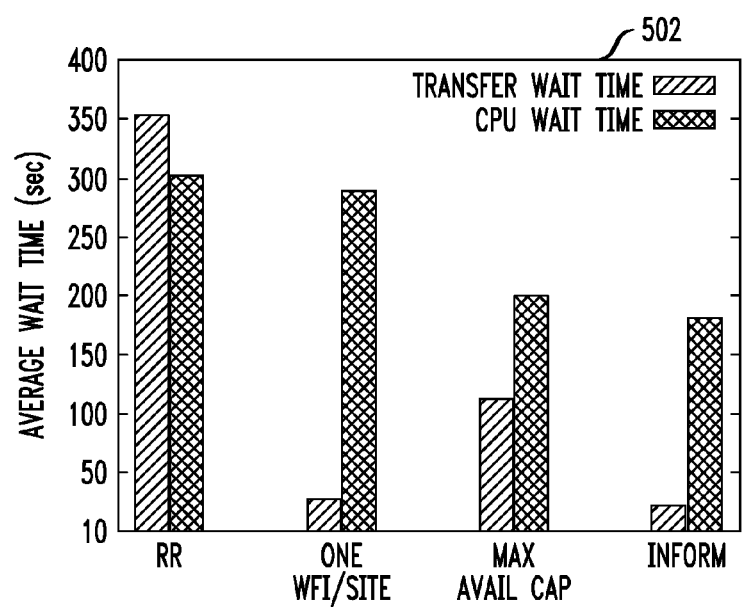
FIG. 5 is a diagram illustrating results of integrated workflow orchestration and scheduling, according to an embodiment of the present invention.

FIG. 5 is a diagram 502 illustrating results of integrated workflow orchestration and scheduling, according to an embodiment of the present invention. As depicted by FIG. 5, the average wait time for CPU and data transfer uniformly low for INFORM. CPU wait time is due to the building-up of compute queues, and transfer wait time is due to data transfers not yet completed (that is, the building-up of data queues). As such, FIG. 5 illustrates that executing one workflow at a site with no inter-mingling of jobs performs badly on shared resources.

Figure 6:
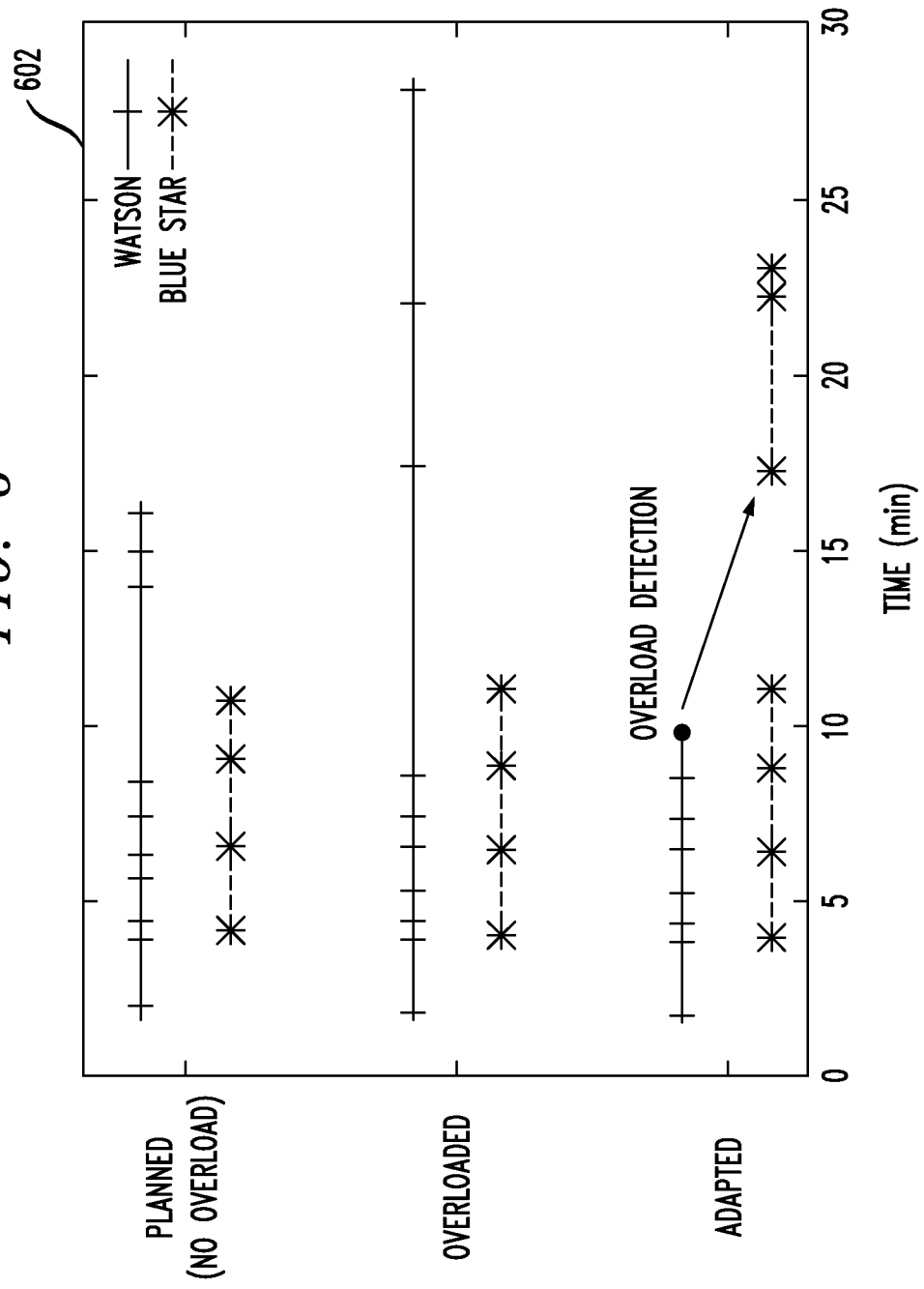
FIG. 6 is a diagram illustrating results of run-time schedule modification at Integrated Flow Scheduler (IFS), according to an embodiment of the present invention.

FIG. 6 is a diagram 602 illustrating results of run-time schedule modification at integrated flow scheduler (IFS), according to an embodiment of the present invention. By way of illustration, FIG. 6 depicts local modification of a workflow schedule, wherein the original schedule was to run at two domains, Watson and BlueStar and the overload was detected by IFS using feedback and/or alerts. Locally modifications were scheduled to run at BlueStar, wherein additional cleanup and remapping of data transfers as well as job assignments were performed. Additionally, job tasks were removed from the Watson queue, data tasks were removed from the Watson queue, new equivalent data transfer tasks were inserted in the BlueStar queue, and new equivalent job execution was inserted for the BlueStar queue. By removing and inserting jobs and data tasks in queues at run-time, IFS adapts to dynamic changes in grid environments.

Principles of the invention, as noted above, include co-scheduling job computation, data transfer and replication activities such that performance criterion of a single or batch of workflow applications is satisfied. Optimized co-scheduling of data-intensive workflows facilitates shrinking batch windows, thereby optimizing grid resource usage. This can act as a key differentiator for enterprises and helps reduce operation costs. In addition, unpredictable workload variations in these long running execution environments can render run-time adaptations equally invaluable. However, the cost of these adaptations needs to be accounted for, so that they are not disruptive to the original optimizations.

One or more embodiments of the present invention include a technique based on reconfiguration of computation and data schedules, where reconfiguration choices are evaluated for both potential improvement in performance and degradation due to additional data movements. In existing approaches, core grid workflow languages are either task-based, which enable data and computation descriptions to be defined together, or service-based, where applications are wrapped using standard interfaces and data definition is decoupled from processing. The service-based approach is a promising step towards standardization of work-flow systems. However, for the resource management layers, a task-based approach provides greater scope of optimization. In a hybrid approach, as described herein, one or more embodiments of the invention include a service-based WS-BPEL (or BPEL) is used for workflow modeling, and job-like semantics are built into it for data activities using the job submission description language (JSDL) specification.

Such an approach enables job and data to be managed and orchestrated as equivalent entities in the workflow. Also, such an approach provides a continuum in data management between techniques that use legacy interfaces for data representation and others that decouple data description from computation.

Performance of an application can be measured, for example, by its response time (that is, the total time to finish all jobs and associated data activities). The setting can include, for example, multiple domains linked by WAN connections, with each controlling its own resources and data sets. The domains represent geographically distributed sites of an organization, and can be controlled by a representative meta-scheduler. The meta-scheduler, along with its controlled domains, forms a grid. Aggregate information about resources, datasets and execution performance can be collected and used by the meta-scheduler to route tasks to appropriate domains.

According to data grid principles, resources and datasets can be virtualized and associated with a location and infrastructure independent name space that facilitates resource and data access, transparent data movement, and replication. Also, the meta-scheduler works in conjunction with a flow orchestrator, responsible for controlling execution of work-flow tasks.

Standardization of flow modeling tools is advantageous for creation of flexible and interoperable distributed architectures. As described herein, one or more embodiments of the present invention use BPEL, originally proposed as a standard for web-services. Also, the techniques described herein can also, for example, extend the BPEL representation for modeling data flows as invoking activities that are orchestrated and managed equivalent to jobs.

During processing of large data sets, application throughput can be greatly improved by exploiting data parallelism. Because grid jobs are typically long-running, increasing data availability by dynamic replica creation, and co-locating jobs with data help achieve superior performance. As such, one or more embodiments of the invention include an integrated approach for deriving compute-data assignments and scheduling compute-data tasks, such that maximal parallelization and overlapping of activities can be obtained.

While static scheduling can help in creating optimized data flows, run-time adaptations can handle bottlenecks in a grid created by transient or permanent resource outages. As described herein, making use of application level knowledge to exploit data-job correlations, and using them to optimize trade-offs between performance benefit of a reconfiguration and its incurred overhead, can lead to controlled adaptations, thereby adding responsiveness without creating system instability.

An illustrative embodiment of the present invention can adopt a two-level approach. One level can include service orchestration at the upper level to control coarse-grain compute and data flow submissions to the resource management layer. Also, a second layer can include, for example, coordinated scheduling and run-time management at the lower resource management layer to control interactions among executing jobs and data transfers.

Figure 7:
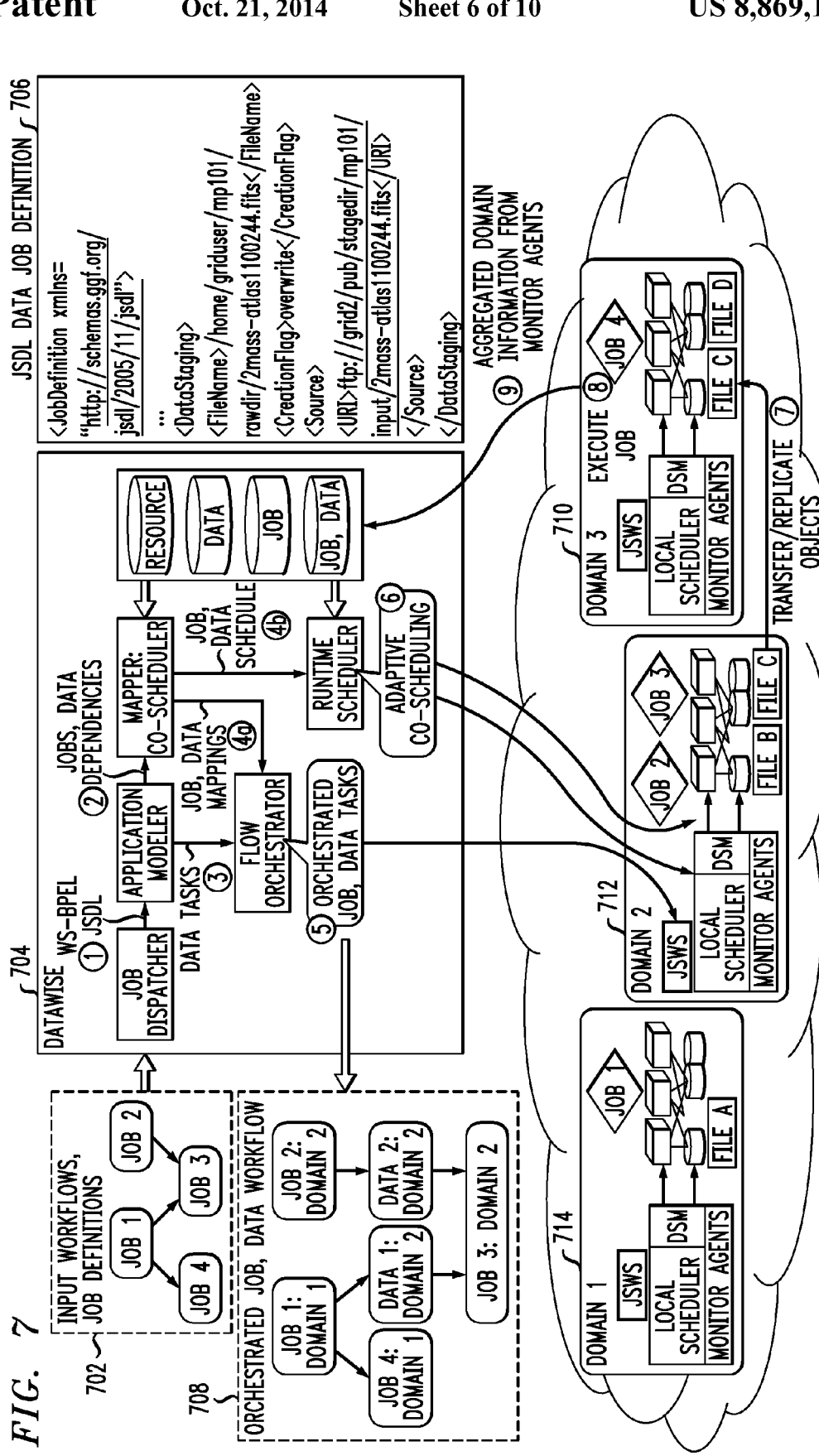
FIG. 7 is a diagram illustrating data-WISE architecture, according to an embodiment of the present invention.

FIG. 7 is a diagram illustrating Data-WISE architecture, according to an embodiment of the present invention. FIG. 7 depicts the elements of input workflows and job definitions 702, Data-WISE 704, job submission description language (JSDL) data job definition 706, orchestrated job and data workflow 708, domain three 710, domain two 712 and domain one 714. Data-WISE 704 includes a job dispatcher, an application modeler, a flow orchestrator, a mapper: co-scheduler, a run-time scheduler, resources, data, jobs and data. Domain one 714 includes JSWS, local scheduler, data staging manager (DSM), monitor agents, job one and file A. Domain two 712 includes JSWS, local scheduler, DSM, monitor agents, job two, job three, file B and file C. Domain three 710 includes JSWS, local scheduler, DSM, monitor agents, job four, file C and file D.

By way of illustration, as depicted in FIG. 7, the input to the system is through the job dispatcher component that accepts a single workflow or batch of workflows. The job dispatcher component has interfaces for accepting abstract BPEL workflows. Workflows are abstract in the sense that the exact grid resources for job execution are unspecified and capture only the control flow between jobs. Also, each job has a JSDL description associated with it.

The batch of workflows is submitted to an application modeler toolkit that extracts data dependencies from the submitted workflows and its job definitions, and creates new data flows for incorporation in the workflow. The modeling phase produces a directed acyclic graph (DAG) for each application that represents its job execution and data flows.

The DAG is submitted to a mapper component of the meta-scheduler, which includes the brain of Data-WISE. The mapper component is where jobs and data flows are intelligently mapped to domains. The mapper gathers information from several information sources including, for example, a resource repository that stores dynamic information about available central processing unit (CPU), memory, network, queue length, etc. The information is gathered by monitoring sub-systems associated with peer and local domains.

A data repository can store mappings between logical namespaces and physical data location, with multiple data copies present at different locations for higher availability. A job performance repository can store profiled history of job execution on resources. The mapper uses this information, along with resource requirements specified in the JSDLs, to map jobs and data flows to specific VO domains based on co-scheduling principles. The mapper also identifies any additional optimizations that can be made through the creation of replicas of popular data items. Replication can save on multiple transfers over WAN links via higher availability.

While the mapper is analogous to the brain of Data-WISE, the flow orchestrator is analogous to the heart of the system, handling execution of all job and data activities. The flow orchestrator takes the newly created data activities and suggested domain mappings, and concretizes the workflow (bindings) for execution. Concretized workflows are executed by the flow engine of the orchestrator. Also, jobs are submitted from the orchestrator to corresponding domains through a "job submission proxy," that is, job submission web service (JSWS), that provides an interface to the domain's local scheduler (LS) and to the data staging manager (DSM).

The LS queues submit jobs and schedule them according to its local policies. The DSM queues submit data jobs and schedule the data transfers over network links. Also, the DSM queues integrate with other file transport and replica management services to perform activities of data movement, replication and registration as identified by the mapper. DSM also has the capability to subsume functionality provided by data schedulers such as, for example, Stork.

Additionally, Data-WISE employs a run-time scheduler component that acts as limbs for the system. For each domain, the run-time scheduler interacts with the advanced reservation subsystem of local schedulers to create and/or modify reservations as well as start and/or suspend jobs, and ensures execution of all activities submitted by the orchestrator is done according to the mapper schedule. The run-time scheduler also enforces queue management for all domains, thereby adapting to varying resource conditions during the execution of the batch of workflows.

As described herein, stages of Data-WISE can include, for example, modeling and orchestration of data flows, co-scheduling of data flows with job executions, and run-time adaptations due to varying load and/or resource conditions.

Application workflows can be input to the modeler toolkit using abstract templates. In BPEL semantics, partnerlink bindings for such workflows invoke statements that are unspecified. Use of abstract flow delegates the responsibility of selecting appropriate end points for execution to the meta-scheduler, and helps in creating reusable workflows. Moreover, the flow corresponds mostly to compute tasks with no notion of how input and/or output data is delivered to and/or from the computations.

In one or more embodiments of the present invention, the modeler can have functionalities such as, for example, extraction of job-job and job-data dependencies from the composite BPEL+JSDL documents and creation of new data flows by co-relating the input and output data dependencies with respect to the control flow. Each compute job can define its data input and output using JSDL. Also, each data object in the JSDL can be identified by a unique logical name which can map to multiple physical names. Using control dependencies in BPEL and by correlating the input and output (logical) names, data flows between jobs can be extracted out. Also, new data JSDL documents (as depicted, for example, in FIG. 7) can be created for these data flows specifying how and from where the data should be transferred and/or made available.

At the orchestrator, the BPEL workflow can be concretized and made ready for execution by, for example, replacing empty partnerlink bindings with references to domain specific partners (as suggested by the mapper), and adding new invoke activities in the workflow for data activities such as transfer, replication, registration, etc., with data JSDLs passed as parameters to the corresponding invokes. Also, the BPEL workflow can be concretized and made ready for execution by adding links among activities to capture dependencies between a job and its dependent data activities. The orchestrator can also manage, monitor and execute these data invokes along with their compute counterparts.

With respect to optimal co-scheduling of compute and data activities for a batch of workflows, note that the input datasets are distributed across domains. As such, subsequent job executions can create intermediate datasets that are consumed by dependent jobs.

By way of example, consider a set of M domains, N datasets, and K jobs. Each domain i has compute capacity $A_i$ and storage capacity $S_i$. Domains a and b are connected by a link of bandwidth $bw_{ab}$. Each object o is of size $s_o$ and has replica set $R_o$. Each job j has compute requirement $e_j$, and dataset $F_j$ to operate on. Precedence $j_1 < j_2$ indicates existence of compute and/or data dependencies between two jobs. A compute dependency denotes $j_1$ needs to finish executing before $j_2$ can start. A data dependency that indicates $j_1$ creates an output used by $j_2$. Affinity can be defined as $j_1 \triangleright j_2$, if output of $j_1$ is used only by $j_2$, and $j_2$'s only input is created by $j_1$.

Let $\beta_{io}$ denote 1 if data object o is replicated at site i, and 0 otherwise. For job j executing at domain site i, let $te_{ij}$ denote its execution time, $tr_{ij}$ denote total transfer time of all objects not locally present at i, trio denote transfer time of a data object o to site i, and $bestReplica(i,o) \in R_o$, denote the domain site that holds the replica of o and connected by the highest bandwidth link to i. As such, the total job execution time is:

$$t_{ij} = te_{ij} + tr_{ij}, \quad (1)$$

where $$tr_{ij} = \sum_{o \in F_j} tr_{io} \quad (2)$$

and $$tr_{io} = (1 - \beta_{io}) \frac{s_o}{bw}(i, bestReplica(i, o)) \quad (3)$$

Let $\alpha_{ijl}$ be an indicator variable denoting 1 if job j is assigned to site i and finishes execution in time interval 1, and 0 otherwise Let T denote the total makespan of the batch of workflows. Also, an optimal assignment of compute and data to sites such that T is minimized, is found by solving for $\alpha$ and $\beta$ in the following program:

Maximize $$T = \sum_{i=1}^{M} \sum_{j=1}^{K} \sum_{l=1}^{L} \alpha_{ijl} U_{jl} \quad (4)$$

subject to $$\sum_{i=1}^{M} \sum_{j=1}^{L} \alpha_{ijl} = 1, \forall j \quad (5)$$

$$\sum_{p=1}^{l} \sum_{j=1}^{K} \alpha_{ijp}\left(te_{if} + \sum_{o \in F_j} tr_{io}\right) \leq A_i l, \forall i, l \quad (6)$$

$$\sum_{o=1}^{N} \beta_{io} s_o \leq S_i \forall i \quad (7)$$

-continued $$\sum_{i=1}^{M}\sum_{p=1}^{l}\alpha_{ij1p} \geq \sum_{i=1}^{M}\sum_{p=1}^{l+ic_{ij2}}\alpha_{ij2p} \forall l = 1 \ldots L \forall_{j_1} \prec j_2 \quad (8)$$

$$\sum_{l=1}^{L}\alpha_{ij1l} = \sum_{l=1}^{L}\alpha_{ij2l} \forall i, j_1 \triangleright j_2 \quad (9)$$

Feasibility constraint (5) ensures that each job finishes in exactly one time interval at a site. Compute constraint (6) makes sure that the number of jobs that complete in time 1 at a site is at most $A_i$ times 1. Storage constraint (7) ensures that the size of the replicas created is within a storage limit. Precedence constraint (8) ensures that a job does not begin execution before its preceding job finishes. Affinity constraint (9) ensures that affine jobs are co-located. The above problem is Max-SNP hard and one can employ a heuristic based on linear relaxation of $\alpha$ and $\beta$ values. For example, a heuristic can include a two-step solution as follows:

First, one can find an assignment of compute tasks and datasets (input, intermediate and any additional replicas) to domains, considering constraints (5)-(9). Subsequently, one can compute a master schedule that specifies (1) for all data activities, the source-destination domains and initiation times, and (2) for all job activities, the execution domains and initiation times.

In addition to a heuristic algorithm, the mapper in Data-WISE can also take in precedence and affinity relations imposed by flow optimizations. This can be used to identify all compute-data placements and execution order for all compute-data activities. The domain mappings are used by the orchestrator, and the compute-data schedule guides the run-time scheduler.

While static co-scheduling helps in planning for optimal resource usage, the inherent unpredictability in grid environments may often lead to deviations from expected performance. As such, Data-WISE relies on monitored information from the compute and data queues at each site (domain) to provide run-time adaptations that help maintain application throughput, in face of unpredictable load conditions.

As described herein, backfilling can be used as a technique in parallel scheduling systems, as it improves utilization by identifying gaps in a static reservation schedule. Gaps may arise due to un-submitted jobs, jobs finishing earlier than estimated, etc. Backfilling moves forward smaller "ready" jobs to fill these gaps without delaying jobs with reservations. However, common backfilling estimates are purely based on compute times. A compute could be blocked either due to a control dependency (predecessor compute blocked) or a data dependency (that is, data transfer blocked). As such, one or more embodiments of the present invention employ an aggressive backfilling scheme that estimates head-of-queue delay based on wait time due its predecessor job in the compute queue, as well as wait time in the data queue. Thus, the estimated delay of job j at site i due to an unfinished precedent job j' producing data o is, $$tdelay_{jj'}^i = \begin{cases} tr_{ij} & \text{if } j' \text{ is executing} \\ tr_{io} + ie_{ij'} & \text{if } j' \text{ is yet to execute} \end{cases}$$

and the total delay of j at i due to all such dependencies is, $$tdelay_j^i = \max_{\forall j' \prec j} tdelay_{jj'}^i \quad (10)$$

Once the delay is estimated for the head-of-queue, a job that is ready for execution can be allowed to start if its estimated completion time is less than the estimated delay. A "smallest job first" policy can be used to select one among multiple candidates that can fill the gap. The data queue can be similarly backfilled based on estimated wait time (due to earlier transfers) of the head-of-data-queue.

Congestion at queues can result, for example, from resource outages, surges in background traffic, etc. As such, one or more embodiments of the present invention employ pro-active congestion detection and avoidance to maintain high throughput. Such techniques observe queue sizes and burst durations to detect incipient congestion in the compute and/or data queues, and use run-time reconfigurations in the schedule to cope with them.

For each compute and/or data queue q, we define two thresholds, $\min_q$ and $\max_q$. Values for $\min_q$ and $\max_q$ are based on allowable average burst lengths, typically $\max_q \geq 2*\min_q$. At time t, if average queue length $avg_t$ is above $\min_q$, the reconfiguration algorithm is invoked on the queue. The average queue length can be calculated using an exponential weighted moving average, given by $avg_t=(1-w)*avg_{t-1}+w*qlen_t$, where $qlen_t$ is the length of q at time t.

Principles of the present invention also include selecting jobs to move. A run-time reconfiguration in the original schedule involves movement of yet-to-start compute and/or data job(s) to another queue. One or more embodiments of the invention include comparison with a well-known random early detection (RED) approach from network congestion space, albeit accounting for data flows. In short, the probability of selecting a particular job j for moving, $\hat{p}_j$, depends on the average queue length, the last time a job was moved from the queue, and also data characteristics of the job.

As the average length varies at a queue (belonging to site i) from $\min_q$ to $\max_q$, the probability that a new compute job j is moved varies linearly from 0 to P (a small fraction). The final moving probability $\hat{p}_j$, however, also increases slowly with the number of jobs seen since last move (count), and decreases as the local data of j at i increases. The probability can be defined as, $$\hat{p}_j = \frac{p_b}{(1 - \text{count} * p_b)} * p_{ij}, \quad (11)$$

where $$p_b = \frac{(avg_q - \min_q)}{(\max_q - \min_q)} * P, \quad (12)$$

$$p_{ij} = \frac{\Delta_{\max} - \Delta_{i,j}}{\Delta_{\max} - \Delta_{\min}} \quad (13)$$

$\Delta_{max}$, $\Delta_{min}$ denote the maximum and minimum (respectively) data requirements of j, and $\Delta_{ij}$ is the size of local data present for j at site i. Intuitively, this is the "stickiness" factor of a job to a site, with higher values indicating a lower probability of movement.

A similar technique can be employed for probabilistically selecting jobs from a congested data queue. Moving a data job can involve moving the activity (for example, transfer, replication, etc.) to a different link between the same end points, or to a link to the site having a replica of the same data. Hence, $p_{ij}=1$ when an alternate link or replica is available, and 0 otherwise.

Having selected a job to move, one can identify a target compute and/or data queue for the job. In case of a compute, it is the queue where the compute job incurs minimum execution time, queue wait time, and data transfer time (if any). As is evident, the queue length of the target must be below the maximum length even after the move. Also, a data job can be moved to an alternate queue that has maximum link bandwidth.

As described below, the performance of Data-WISE was evaluated on a grid test-bed across three geographically distributed sites. The sites, referred to herein as IRL (New Delhi), Watson (New York), and Bluestar (New Delhi) have 8, 10, and 7 2.33-Gigahertz (GHz) nodes, respectively. The Watson site connected to IRL and Bluestar over a high latency 2 megabits per second (Mbps) link, while IRL and Bluestar had a relatively better connectivity of 10 Mbps between them. Bandwidth and CPU usage was shared by multiple users and actively controlled through a fair share access policy. A dedicated storage space of 20 Gigabytes was allocated per user to each site and was accessible over network file system/file transfer protocol (NFS/FTP) from local machines over a gigabytes per second (Gbps) LAN. Files were transferred across sites using file transfer protocol (FTP). Also, Data-WISE was deployed at IRL and coordinated workflow management across the three sites.

In an illustrative embodiment, IBM Websphere Process Server3 was used as the flow orchestrator, and IBM Tivoli Workload Broker was used as the meta-scheduler component in Data-WISE. Additionally, one or more embodiments of the present invention enhanced the capability of the broker for co-scheduling of compute-data activities.

The workload was a mix of Montage applications with a basic scatter-gather structure. The number of fan-outs and fan-ins at each level were varied to simulate a heterogeneous mix in workload composition structure. Each workflow, on average, included 25 compute jobs and 20 data jobs. A batch of 25 workflows was submitted to the grid for execution. To obtain estimates of job execution time, the jobs were profiled at each site, and the observed values across multiple runs were averaged. The estimates ranged between 3-6 minutes.

Input datasets for the profiled applications were in the range of 5-10 megabyte (MB) and distributed among the sites. The intermediate datasets followed a relatively heavy-tailed distribution, with about 80% of the datasets between 5-20 MB, and 20% between 20-100 MB.

Background traffic can be introduced, for example, to evaluate Data-WISE performance in case of competing applications. The traffic can include, for example, compute (data) jobs that compete for the same CPU (network) resources. The background jobs can be set to have comparable execution (transfer) times as workflow jobs with comparable completion times. For each site, the steady-state background traffic follows a Poisson distribution, with exponential inter-arrival time $e^{-\lambda T}$, and $\lambda$ randomly picked between 3-5 jobs/second. To simulate a congestion at time t, one can pick a compute site or network link and increase its background load to $K*\lambda$ (that is, K is the congestion factor). The load is sustained till time $(t+\Delta t)$ minutes, during which both compute and network queues build up.

Evaluation of Data-WISE in terms of data and resource management can be done, for example, in two parts. First, in case of a steady-state background load, the co-scheduling batch algorithm (with backfilling) can be evaluated with respect to multiple approaches. For example, one approach can include one workflow per site (OneWfl/site), wherein each workflow executes entirely at a single site. Another approach can include a round-robin (RR), wherein job executions load balanced across multiple sites. Additionally, an approach (referred to herein as the greedy approach) can include jobs dispatched to the site with minimum sum of job execution and transfer times.

Because OneWfl/site has no intermediate data transfers, replication of datasets is not required. For the latter two evaluation approaches (that is, round robin and greedy) noted above, a decoupled scheme can be used at each site, where data sets accessed above a threshold are replicated locally. Also, as described herein unpredictable and bursty load conditions were introduced, and Data-WISE run-time was compared with RED congestion management. The main parameters used were makespan (that is, the total time to execute a workload), bandwidth usage (that is, data transferred across sites), average CPU wait time of jobs (that is, time spent by a job waiting in queue for resources to be available), and average transfer time wait for jobs (that is, time spent by a job waiting for its data arrival).

Figure 8:
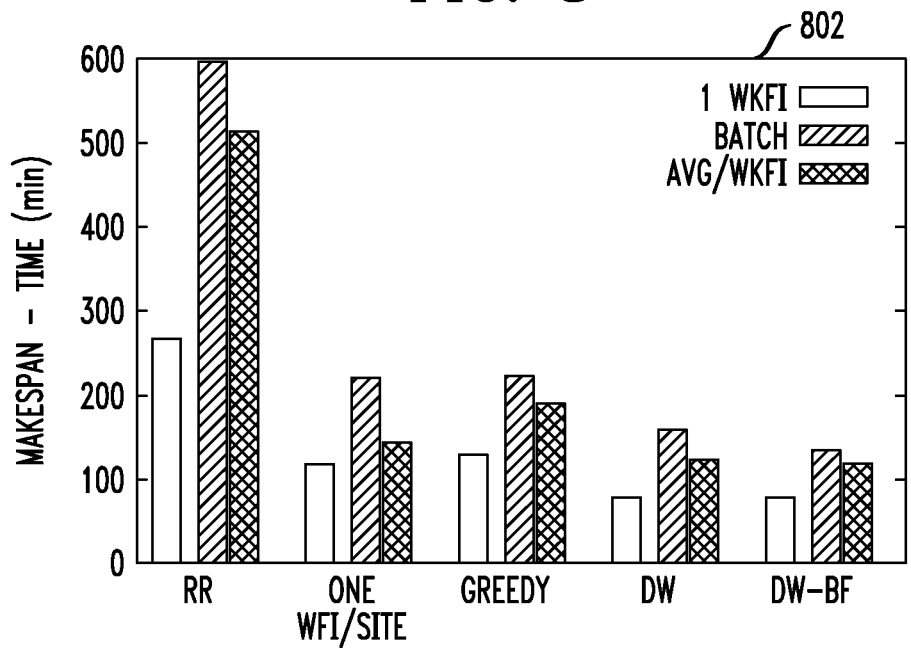
FIG. 8 is a diagram illustrating results of makespan, according to an embodiment of the present invention.
Figure 9:
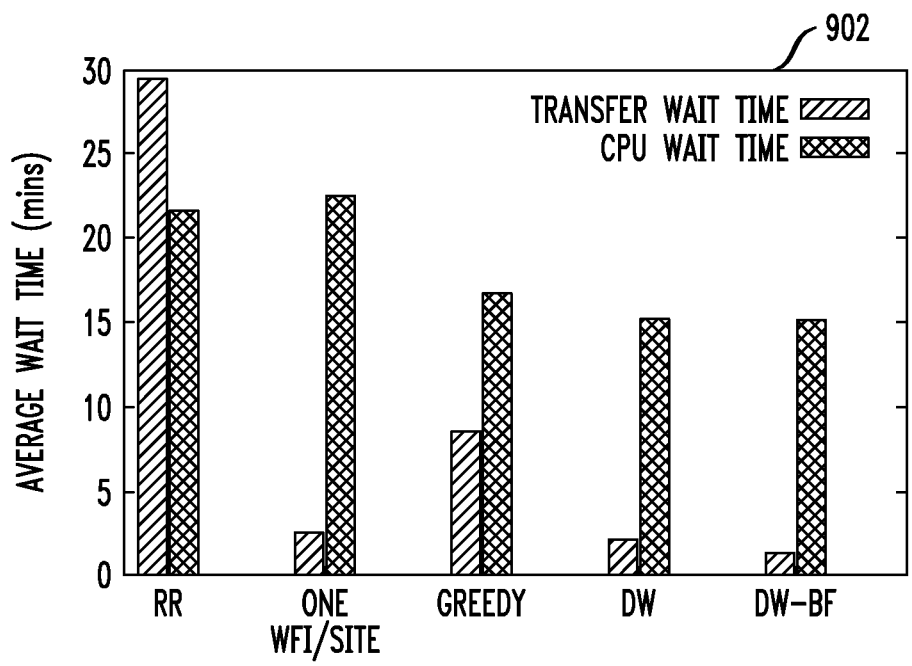
FIG. 9 is a diagram illustrating results of wait time, according to an embodiment of the present invention.

FIG. 8 is a diagram illustrating results of makespan 802, according to an embodiment of the present invention. FIG. 9 is a diagram illustrating results of wait time 902, according to an embodiment of the present invention. By way of illustration, FIG. 8 and FIG. 9 depict the makespan and wait time statistics for the alternative approaches, respectively, in comparison to Data-WISE (with and without backfilling), when the background traffic at all the sites is at a steady state (that is, $3 \leq q_i \leq 6$). Note that makespans are indicative of wait times at the CPU and network queues, where the CPU wait time reduces when a job is assigned to a compute site with low queue lengths.

Similarly, transfer wait time reduces with overlapped and parallelized data transfers with job executions. A special case of the makespan, when the batch constitutes a single workflow, is illustrated in FIG. 8 for validation of co-scheduling principles. As noted herein, smart scheduling of job executions and file transfers help Data-WISE (DW) achieve about 40% reduction in makespan. Round robin (RR) makespan is the worst mainly due to the fact that the cyclic job placement limits benefits from data replication, as dependent jobs can rarely take advantage of locality of data access. The same trend is noticed for RR in the case of batch workload, indicating high makespans as well as wait times (as illustrated in FIG. 8 and FIG. 9).

The greedy approach achieves a lower CPU and transfer wait time by placing the job judiciously and replicating data using a decoupled approach. However, in absence of a co-scheduling scheme that overlaps these data activities with job executions, the transfer wait times are still much higher when compared to DW. In OneWfl/site, transfer waits are already minimized due to locally produced intermediate data. However, the compute wait is high due to a large number jobs being assigned to a single site, consequently increasing the batch makespan.

In terms of overall batch and average makespan, both greedy and OneWfl/site approaches are comparable (as depicted in FIG. 8). Interestingly, this indicates that both CPU and transfer waits have equivalent influence on overall makespan. DW approaches strike a balance by weighing the transfer time penalties versus compute delays. Data-WISE with back-filling (DW-BF) (as described above) achieves the lowest makespan and the lowest CPU and transfer waits by reducing gaps in compute and data queue schedules at run-time. Thus, in the case of batch, the interplay of job-data dependencies for multiple workflows, along with the dynamics of uniform background traffic at the CPU and network resources, create opportunities for data and compute jobs to be backfilled. As a result, we notice a 10-15% reduction in wait times due to backfilling, which is a characteristic of a real-world batch processing scenario.

Also, described herein is the data transferred (in GB) by DW over the high latency links due to its distributed execution of work-flows. Recall that Data-WISE can adopt two distinct approaches to reduce its data transfer overhead, co-location of affine jobs, and replication of popular datasets so as make them highly available.

Figure 10:
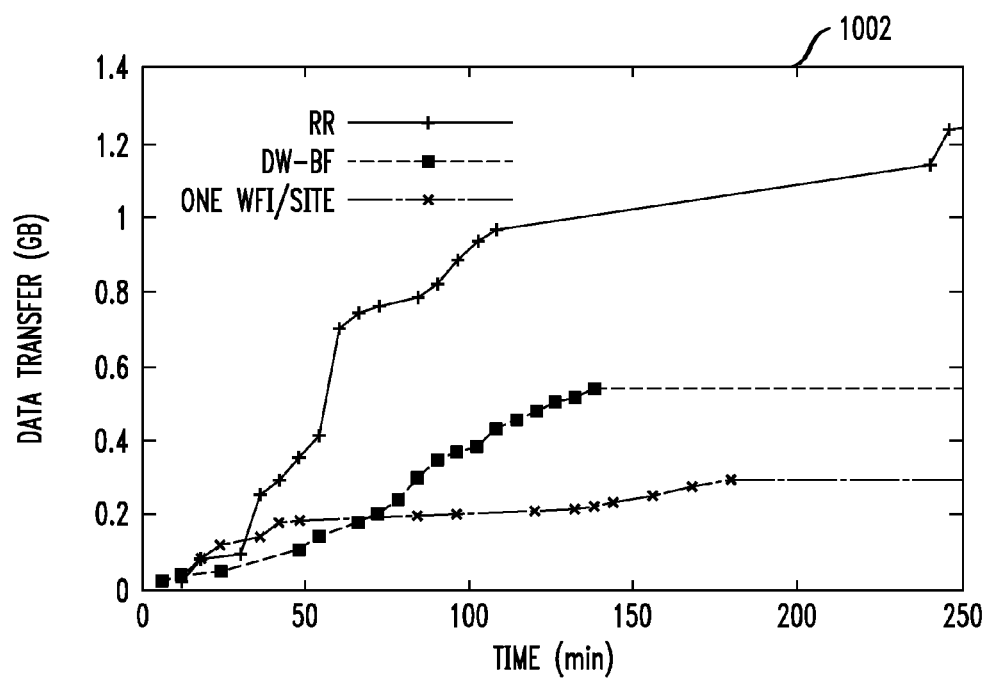
FIG. 10 is a diagram illustrating results of data transfer, according to an embodiment of the present invention.

FIG. 10 is a diagram illustrating results of data transfer 1002, according to an embodiment of the present invention. By way of illustration, as depicted in FIG. 10, RR suffers from an overall high overhead due to lack of transfer scheduling. OneWfl/site incurs transfer overhead only for the input files, but none for intermediate files. Data-WISE, on the other hand, has less input transfer overhead and also appreciably dampens its inter-site transfers using affinity and replication optimizations. Considering the overall performance improvement of DW over OneWfl/site, one can argue that this overhead of intermediate data transfers is acceptable.

Additionally, for each job, its finish time was determined with respect to the total makespan of the workload. For OneWfl/site, all initial jobs incur queue delays because of overloading one single site with no load-balancing. This, coupled with the lack of a transfer schedule, delays the total makespan, even though later phases require no intermediate transfers. In comparison, DW jobs are well spread-out across the time interval, and suffer overall minimum delay between dependent activities. Overlapped data transfers with job executions, resulting in very little wait time between jobs and an overall low finish time for Data-WISE.

To simulate overload scenarios, a burst was introduced in the background traffic (with congestion factor set to 5) at one or more sites and/or links which cause the compute and network queues. The burst duration $\Delta t$ was 30 minutes long. Low load in the setup symbolizes load bursts in data traffic at one compute site, medium load indicates load bursts at one compute site and one network link, while high load indicates load bursts at two compute sites and one network link. The DW and RED queue thresholds used were $min_q=6$ and $max_q=12$, with $w_q=0.002$.

Figure 11A:
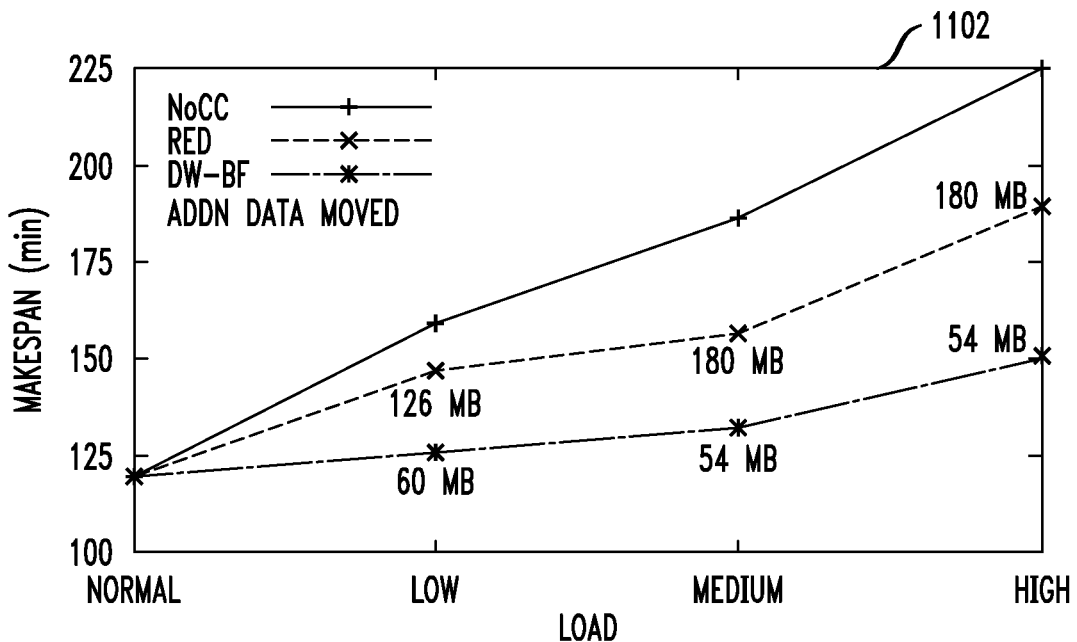
FIG. 11A is a diagram illustrating results of makespan, according to an embodiment of the present invention.

FIG. 11A is a diagram illustrating results of makespan 1102, according to an embodiment of the present invention. By way of illustration, FIG. 11A depicts the makespan due to different load conditions introduced in the background traffic, and the annotations denote the additional data transferred due to run-time job movements. As the load on the system increases, the rate of increase in makespan with RED catches up with the case when no congestion control (NoCC) is deployed, and also suffers from a large data penalty. In comparison, with about one-third less data moved (for same number of jobs moved), DW run-time is able to curb the rate of makespan increase, with corresponding increase in background load.

Figure 11B:
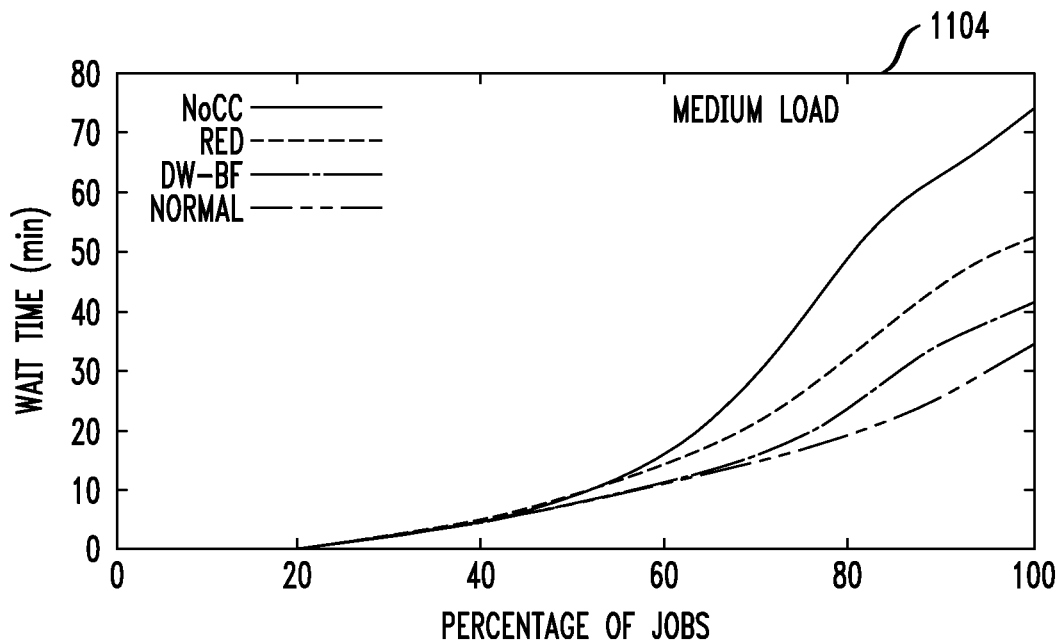
FIG. 11B is a diagram illustrating results of average wait times under load conditions, according to an embodiment of the present invention.

FIG. 11B is a diagram illustrating results of average wait times under load conditions 1104, according to an embodiment of the present invention. By way of illustration, FIG. 11B depicts the CPU wait times for a representative medium load scenario, and illustrates how the overall waits experienced by jobs is controlled suitably by DW with only a 5% increase over the normal case when there is no congestion in the system. While both DW and RED probabilistically mark and move jobs to other queues, their difference in performance lies in which jobs they move and where they are moved. Data-WISE judiciously picks the jobs based on their data dependencies and data characteristics (for example, size, location, replica, etc.), such that the penalty of doing additional data transfers is minimized. Due to the large overhead of RED, its run-time performance benefit is significantly reduced. DW, in contrast, picks the right jobs to move, such that makespan is reduced with at cost of minimum overhead.

Additionally, both RED and DW control the compute queue lengths in case of congestion. However, DW, by moving the right jobs to the right site, and by making use of replicated datasets, is able to quickly dissipate the load. Also, RED, as a consequence of its large additional data transfers, induces high load on the data queues. The already loaded data queues face an additional load due to "un-wise" data management in RED. In these cases, the state of the data queues after management is worse for RED than in case of no run-time congestion control. Thus, while handling congestion by probabilistic movement of jobs (based on queue length and congestion level) in RED has worked well in the past, the complexity of data-intensive workflows given job-data dependencies and scatter-gather synchronization points mandates the criticality of using job-data characteristics while making run-time schedule decisions.

As described herein, one or more embodiments of the present invention include Data-WISE, an end-to-end framework for managing data-intensive workflows as first class citizens, with a focus on data flow modeling, co-scheduling data flows with job executions, and managing the schedules at run-time. As noted above, jobs and data-sets should be managed in close coordination with each other, both statically and at run-time, to ensure efficient execution of data-intensive grid workflows.

As described herein, one or more embodiments of the present invention allow scheduling of multiple workflows across N domains, where workflows can be scheduled in the granularity of individual jobs, sub-flows or whole workflows. Scheduler decisions can be honored in flow orchestration, for example, in multiples ways. For example, for each workflow, jobs and data transfers can be executed on mapped resources. Also, across multiple workflows, the IFS can maintain scheduler ordering of jobs and data transfers.

One or more embodiments of the invention can enable on-demand services for workflow execution. For example, a service provider can offer workflow execution as a service on a subscription basis, and the provider can store customer data. Also, a provider can use a batch workflow execution technique described herein to optimize shared resources.

One or more embodiments of the present invention include a technique based on optimized co-scheduling of data-intensive workflows that help shrink batch windows, thereby optimizing grid resource usage. This acts as a key differentiator for enterprises and helps reduce operation costs. Additionally, one or more embodiments of the invention include run-time re-configurations of job-data placements for a batch of workflows. Unpredictable workload variations, as well as resource downtimes in long-running execution environments, render run-time adaptations equally invaluable. However, the cost of these adaptations needs to be accounted for so that they are not disruptive to the original optimizations. As described herein, one or more embodiments of the invention include a technique based on reconfiguration of computation and data schedules, where reconfiguration choices are evaluated for both potential improvement in performance and degradation due to additional data movements.

Figure 12:
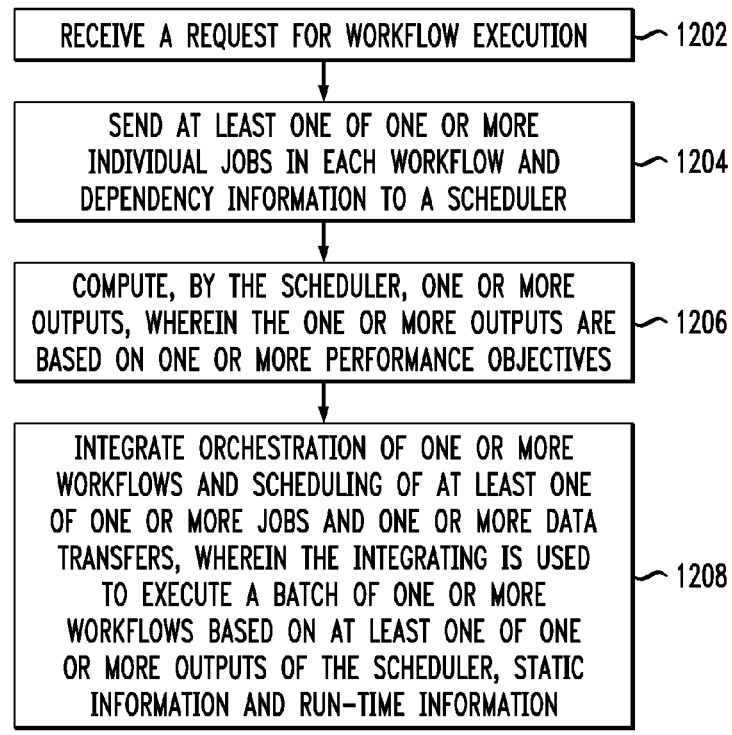
FIG. 12 is a flow diagram illustrating techniques for executing a batch of one or more workflows on one or more domains, according to an embodiment of the present invention.

FIG. 12 is a flow diagram illustrating techniques for executing a batch of one or more workflows on one or more domains, according to an embodiment of the present invention. Step 1202 includes receiving a request for workflow execution. Receiving a request for workflow execution includes a client submitting a request for workflow execution to a dispatcher component. Also, each workflow can be submitted to the dispatcher of one among N (that is, multiple) domains. Such a domain is referred to as the home domain of the particular workflow. A workflow, in whole or any part of thereof, can be executed at any of the N domains.

Each workflow can be expressed, for example, through a set of control and data dependencies and performance requirements. For example, a workflow W1 submitted to a domain can include a control flow graph including a set of control dependencies between jobs (J1-J2, J2-J3 . . . ), a data flow graph including a set of data dependencies between jobs (J1: D1, D2, . . . DN, . . . ), resource requirements associated with the workflow and/or its individual jobs (that is, operating system, file system, network system, software, etc.), and performance objectives (that is, execution time, quality of service (QoS) parameters, etc.). The control dependencies and the data dependencies can act as constraints on the scheduling system. Also, an entire workflow or any part of thereof (that is, jobs and/or sub-flows) can execute on any one of the N domains that satisfies its resource requirements and its performance requirements.

Each domain can include, for example, a workflow orchestrator, a scheduler (for example, a meta-scheduler) and an integrated flow scheduling (IFS) component that coordinate and interact with each other to execute the batch of one or more workflows. A scheduler (for example, a meta-scheduler) can include resource information of the local domain and remote domains (obtained, for example, by interacting with a monitoring sub-system). Based on available resources, the set of jobs, their control and data dependencies, their resource requirements and performance requirements, a scheduler decides on which domains and/or resources the jobs and data transfers should execute and in what order (across workflows for the domain). The scheduler interacts with the IFS to help maintain schedule mappings and orderings. The scheduler can also, for example, decide to schedule at the level of whole workflows, sub-flows, individual jobs and/or data transfers, or a mix of any granularity.

For example, a set of mappings for jobs and data transfers to 1 . . . N domains can include, by way of illustration, W1:J1→Domain1, W1:(D1,D2 . . . Dn-→Domain1, . . . ), W2:J1→Domain2, . . . Two queues can be maintained for each domain, namely a job queue and a data queue. A specific ordering of jobs and data transfers across workflows for each domain can include, for example, an ordering such as the following:

Domain1. Job Queue::W1:J1, W2:J1, W1:J2, W1:J3, W2:J2, W2:J3

Domain1. Data Queue::W1:D1, W2:D2, W1:D2, W2:D2, W2:D3, W1:D3, . . .

Each job and/or data transfer (individual or sub-flow) destined for a remote domain can be submitted through a remote job submission service to the relevant domain. If a sub-flow is submitted to a remote domain, the flow engine of the remote domain controls its execution. If an individual job and/or data transfer is submitted to a remote domain, the remote meta-scheduler is responsible for its execution and notifications. As noted above, a meta-scheduler interacts with the IFS to help maintain scheduler orderings.

An orchestrator interacts with the IFS component to execute the batch of workflows based on the scheduler's outputs. A workflow orchestrator has knowledge of the control and data flows of individual workflows, and it interacts with the scheduler to share the control and data dependencies of each job in the workflow.

An IFS allows local modification to workflow schedules computed by a scheduler to accommodate run-time events and avoid and/or repair problems. Also, an IFS allows interaction of activities between a meta-scheduler and an orchestrator. An IFS can also, for example, bind jobs and/or data transfers to matched resources, as computed by a scheduler, as well as enforce execution of workflows in accordance to scheduler mappings.

Additionally, an IFS allows adaptation of domain schedules based on run-time information such that various run-time workflow scheduling policies can be satisfied. Examples of such run-time information can include any events that change the state of the domain, individual resource or domain related events, feedback, response, alerts, or events from workflow monitors, job executors, data executors, etc.

To locally adapt schedules, an IFS may modify domain queues of jobs as well as data transfers (that is, insert a new task, remove a task, or resume and/or suspend task). Examples of such specialized IFS implementations can include static modification of the flows. As such, an IFS could be a part of the orchestrator that adds schedule dependencies across tasks in the workflow, forming one big flow, and executes this composite flow instead. Deadlock detection can also be handled. Further, an IFS can be an event management system that adds additional events rules in the workflow and manages them. For example, an IFS can add an event rule for W2:J1 to be dispatched by orchestrator only after W1:J1 completes.

An IFS can also dynamically adapt flows at run-time. The integrated component can be a buffering queue maintained for each resource, and the IFS holds all jobs submitted by the orchestrator to that resource. The IFS can also maintain scheduler mappings for the resource and dispatch jobs to the resource in accordance to the computed schedule.

Step 1204 includes sending individual jobs in each workflow and/or dependency information to a scheduler. Step 1206 includes computing, by the scheduler, outputs, wherein the outputs are based on performance objectives. The outputs can include, for example, resource mappings for jobs and data transfers in a workflow and/or a resource specific ordered schedule of jobs and data transfers across workflows. Computing outputs can include, for example, the scheduler using a set (for example, R1, R2, . . . RN) of available resources under control of the scheduler, individual resources, group resources and virtualized resources. Each resource is capable of running jobs and executing data transfers. Also, one or more embodiments of the invention include an executor component associated with each resource that is responsible for executing the job or data transfer on the resource.

Step 1208 includes integrating orchestration of workflows and scheduling of at jobs and/or data transfers, wherein the integrating is used to execute a batch of workflows based on outputs of the scheduler, static information and/or run-time information. Integrating orchestration of workflows and scheduling of jobs and/or data transfers can include, for example, binding jobs and data transfers to resources as mapped by the scheduler. Also, integrating orchestration of workflows and scheduling of jobs and/or data transfers can include enforcing an ordering of one or more jobs across one or more workflows.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 13:
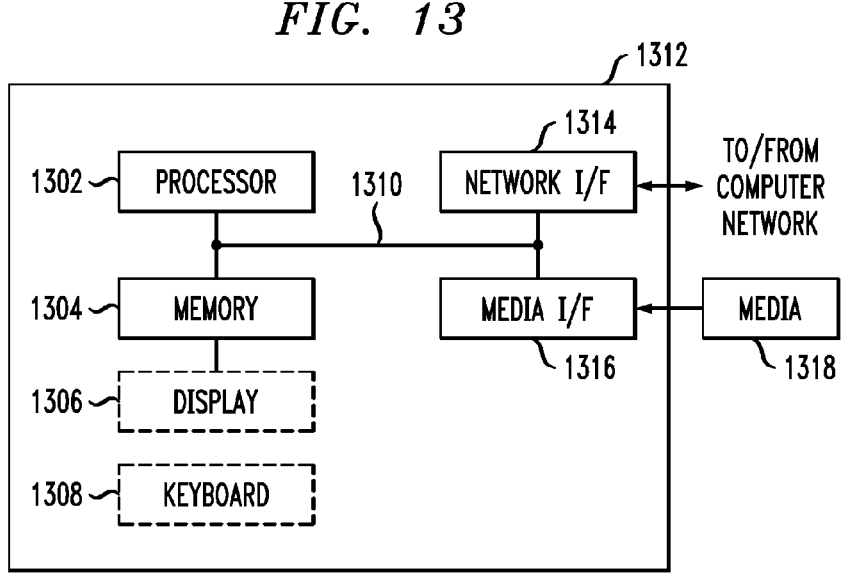
FIG. 13 is a system diagram of an exemplary computer system on which at least one embodiment of the present invention can be implemented.

At present, it is believed that the preferred implementation will make substantial use of software inning on a general-purpose computer or workstation. With reference to FIG. 13, such an implementation might employ, for example, a processor 1302, a memory 1304, and an input and/or output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1302, memory 1304, and input and/or output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1318) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1304), magnetic tape, a removable computer diskette (for example, media 1318), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1302 coupled directly or indirectly to memory elements 1304 through a system bus 1310. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, integrating the functionality of a workflow orchestrator and a job scheduler.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for executing a batch of multiple workflows on multiple domains, comprising steps of:
   receiving a request for workflow execution of a batch of multiple workflows on multiple domains;
   sending at least one of one or more individual jobs in each of the multiple workflows and dependency information to a scheduler;
   assigning (i) the at least one of one or more individual jobs of the multiple workflows and (ii) one or more data activities of the multiple workflows to the multiple domains such that total makespan is minimized subject to multiple constraints, wherein said multiple constraints comprise:
      a feasibility constraint that ensures that each of one or more individual jobs finishes in a first given time interval at a first given domain;
      a compute constraint that ensures that a number of jobs that complete in a second given time interval at a second given domain does not exceed a specified threshold;
      a storage constraint that ensures that the size of any replicated data items is within a storage limit;
      a precedence constraint that ensures that a job does not begin execution before its preceding job finishes; and
      an affinity constraint that ensures that each of one or more affine jobs are co-located;
   computing, based on said assigning, one or more outputs, wherein the one or more outputs comprise (i) one or more resource mappings for one or more jobs and one or more data transfers in each of the multiple workflows and (ii) a resource specific ordered schedule of one or more jobs and one or more data transfers across the multiple workflows; and
   integrating execution of separate tasks of orchestration of the multiple workflows and scheduling of (i) the at least one of one or more jobs and (ii) one or more data transfers of the multiple workflows, wherein the integrating is used to execute the batch of multiple workflows based on the one or more outputs of the scheduler, static information, and run-time adaptations due to varying load, and wherein said integrating comprises:

selecting a given job from the one or more jobs to move from a first queue based on (i) average queue length of the first queue, (ii) recency of a prior job move from the first queue, and (iii) one or more data characteristics of the given job; and targeting a second queue to move the given job based on minimizing (i) execution time of the given job, (ii) queue wait time, and (iii) data transfer time.

2. The method of claim 1, wherein receiving a request for workflow execution comprises a client submitting a request for workflow execution to a dispatcher component.

3. The method of claim 1, wherein each of the multiple workflows is expressed through a set of one or more control and data dependencies and one or more performance requirements.

4. The method of claim 1, wherein integrating orchestration of the multiple workflows and scheduling of (i) the at least one of one or more jobs and (ii) one or more data transfers comprises binding one or more jobs and one or more data transfers to one or more resources as mapped by the scheduler.

5. The method of claim 1, wherein integrating orchestration of multiple workflows and scheduling of at least one of one or more jobs and one or more data transfers comprises enforcing an ordering of one or more jobs across multiple workflows.

6. The method of claim 1, wherein each of the multiple domains comprise a workflow orchestrator, the scheduler and an integrated flow scheduling (IFS) component that coordinate and interact with each other to execute the batch of multiple workflows.

7. The method of claim 6, wherein the IFS component applies one or more local modifications to workflow schedules based on one or more run-time events to at least one of avoid and repair problems.

8. The method of claim 1, wherein computing, by the scheduler, one or more outputs comprises the scheduler using one or more resources for the computing, and wherein the one or more resources comprise at least one of a set of available resources under control of the scheduler, one or more individual resources, one or more group resources and one or more virtualized resources.

9. A computer program product comprising a memory having computer readable program code for executing a batch of multiple workflows on multiple domains, said computer program product including:

computer readable program code for receiving a request for workflow execution of a batch of multiple workflows on multiple domains;

computer readable program code for sending at least one of one or more individual jobs in each of the multiple workflows and dependency information to a scheduler;

computer readable program code for assigning (i) the at least one of one or more individual jobs of the multiple workflows and (ii) one or more data activities of the multiple workflows to the multiple domains such that total makespan is minimized subject to multiple constraints, wherein said multiple constraints comprise:

a feasibility constraint that ensures that each of one or more individual jobs finishes in a first given time interval at a first given domain;

a compute constraint that ensures that a number of jobs that complete in a second given time interval at a second given domain does not exceed a specified threshold;

a storage constraint that ensures that the size of any replicated data items is within a storage limit;

a precedence constraint that ensures that a job does not begin execution before its preceding job finishes; and an affinity constraint that ensures that each of one or more affine jobs are co-located;

computer readable program code for computing, based on said assigning, one or more outputs, wherein the one or more outputs comprise (i) one or more resource mappings for one or more jobs and one or more data transfers in each of the multiple workflows and (ii) a resource specific ordered schedule of one or more jobs and one or more data transfers across the multiple workflows; and computer readable program code for integrating execution of separate tasks of orchestration of the multiple workflows and scheduling of (i) the at least one of one or more jobs and (ii) one or more data transfers of the multiple workflows, wherein the integrating is used to execute the batch of multiple workflows based on the one or more outputs of the scheduler, static information, and run-time adaptations due to varying load, and wherein said integrating comprises:

selecting a given job from the one or more jobs to move from a first queue based on (i) average queue length of the first queue, (ii) recency of a prior job move from the first queue, and (iii) one or more data characteristics of the given job; and targeting a second queue to move the given job based on minimizing (i) execution time of the given job, (ii) queue wait time, and (iii) data transfer time.

10. The computer program product of claim 9, wherein each of the multiple workflows is expressed through a set of one or more control and data dependencies and one or more performance requirements.

11. The computer program product of claim 9, wherein each of the multiple domains comprise a workflow orchestrator, the scheduler and an integrated flow scheduling (IFS) component that coordinate and interact with each other to execute the batch of multiple workflows.

12. The computer program product of claim 11, wherein the IFS component applies one or more local modifications to workflow schedules based on one or more run-time events to at least one of avoid and repair problems.

13. A system for executing a batch of multiple workflows on multiple domains, comprising:

a memory; and at least one processor coupled to said memory and operative to:

receive a request for workflow execution of a batch of multiple workflows on multiple domains;

send at least one of one or more individual jobs in each of the multiple workflows and dependency information to a scheduler;

assign (i) the at least one of one or more individual jobs of the multiple workflows and (ii) one or more data activities of the multiple workflows to the multiple domains such that total makespan is minimized subject to multiple constraints, wherein said multiple constraints comprise:

a feasibility constraint that ensures that each of one or more individual jobs finishes in a first given time interval at a first given domain;

a compute constraint that ensures that a number of jobs that complete in a second given time interval at a second given domain does not exceed a specified threshold;
   a storage constraint that ensures that the size of any replicated data items is within a storage limit;
   a precedence constraint that ensures that a job does not begin execution before its preceding job finishes; and
   an affinity constraint that ensures that each of one or more affine jobs are co-located;
compute, based on said assigning, one or more outputs, wherein the one or more outputs comprise (i) one or more resource mappings for one or more jobs and one or more data transfers in each of the multiple workflows and (ii) a resource specific ordered schedule of one or more jobs and one or more data transfers across the multiple workflows; and
integrate execution of separate tasks of orchestration of the multiple workflows and scheduling of (i) the at least one of one or more jobs and (ii) one or more data transfers of the multiple workflows, wherein the integrating is used to execute the batch of multiple workflows based on the one or more outputs of the scheduler, static information, and run-time adaptations due to varying load, and wherein said integrating comprises:
   selecting a given job from the one or more jobs to move from a first queue based on (i) average queue length of the first queue, (ii) recency of a prior job move from the first queue, and (iii) one or more data characteristics of the given job; and
   targeting a second queue to move the given job based on minimizing (i) execution time of the given job, (ii) queue wait time, and (iii) data transfer time.

14. The system of claim 13, wherein each of the multiple workflows is expressed through a set of one or more control and data dependencies and one or more performance requirements.

15. The system of claim 13, wherein each of the multiple domains comprise a workflow orchestrator, the scheduler and an integrated flow scheduling (IFS) component that coordinate and interact with each other to execute the batch of multiple workflows.

16. The system of claim 15, wherein the IFS component applies one or more local modifications to workflow schedules based on one or more run-time events to at least one of avoid and repair problems.

17. The system of claim 13, wherein in computing one or more outputs, the at least one processor coupled to said memory is further operative to use one or more resources for the computing, wherein the one or more resources comprise at least one of a set of available resources under control of the scheduler, one or more individual resources, one or more group resources and one or more virtualized resources.

\* \* \* \* \*